US010800676B2

(12) United States Patent
Ikuno

(10) Patent No.: US 10,800,676 B2
(45) Date of Patent: Oct. 13, 2020

(54) METHOD FOR TREATING WATER CONTAINING LOW-MOLECULAR-WEIGHT ORGANIC SUBSTANCE

(71) Applicant: KURITA WATER INDUSTRIES LTD., Tokyo (JP)

(72) Inventor: Nozomu Ikuno, Tokyo (JP)

(73) Assignee: KURITA WATER INDUSTRIES LTD., Tokyo (JP)

(*) Notice: Subject to any disclaimer, the term of this patent is extended or adjusted under 35 U.S.C. 154(b) by 101 days.

(21) Appl. No.: 15/128,306

(22) PCT Filed: Mar. 23, 2015

(86) PCT No.: PCT/JP2015/058740
§ 371 (c)(1),
(2) Date: Sep. 22, 2016

(87) PCT Pub. No.: WO2015/151899
PCT Pub. Date: Oct. 8, 2015

(65) Prior Publication Data
US 2017/0121190 A1 May 4, 2017

(30) Foreign Application Priority Data
Mar. 31, 2014 (JP) ................ 2014-074080

(51) Int. Cl.
*C02F 1/44* (2006.01)
*B01D 61/02* (2006.01)
(Continued)

(52) U.S. Cl.
CPC ............ *C02F 1/441* (2013.01); *B01D 61/025* (2013.01); *B01D 2317/02* (2013.01);
(Continued)

(58) Field of Classification Search
CPC ............... C02F 1/441; C02F 2103/346; C02F 2209/20; B01D 61/025; B01D 2317/02; B01D 2317/04; B01D 2319/02
See application file for complete search history.

(56) References Cited

U.S. PATENT DOCUMENTS 5,573,662 A * 11/1996 Abe ..................... B01D 61/022
210/188
6,187,200 B1 2/2001 Yamamura et al.
(Continued)

FOREIGN PATENT DOCUMENTS

JP S52-073188 A 6/1977
JP H08-108048 A 4/1996
(Continued)

OTHER PUBLICATIONS

PCT/ISA/210, "International Search Report for International Application No. PCT/JP2015/058740".
(Continued)

*Primary Examiner* — Bobby Ramdhanie
*Assistant Examiner* — Donovan Bui-Huynh
(74) *Attorney, Agent, or Firm* — Manabu Kanesaka

(57) ABSTRACT

Provided is a method for treating water containing a low-molecular-weight organic substance which enables the low-molecular-weight organic substance to be removed with certainty at a sufficient level without subjecting the water to a biological treatment. A method for treating water containing a low-molecular-weight organic substance, the method comprising passing raw water to a high-pressure reverse-osmosis-membrane separation device, the raw water containing a low-molecular-weight organic substance having a molecular weight of 200 or less at a concentration of 0.5 mgC/L or more, wherein an amount of brine discharged from a reverse-osmosis-membrane module (5a) disposed at
(Continued)

an end of a final stage of the high-pressure reverse-osmosis-membrane separation device is 2.1 m³/(m²·D) or more.

10 Claims, 1 Drawing Sheet

(51) Int. Cl.
*C02F 103/34* (2006.01)
*C02F 101/30* (2006.01)

(52) U.S. Cl.
CPC ...... *B01D 2317/04* (2013.01); *B01D 2319/02* (2013.01); *C02F 2101/30* (2013.01); *C02F 2103/346* (2013.01); *C02F 2209/20* (2013.01)

(56) References Cited

U.S. PATENT DOCUMENTS

| | | | |
|---|---|---|---|
| 6,398,965 B1 * | 6/2002 | Arba | C02F 1/42 210/257.2 |
| 2003/0098275 A1 * | 5/2003 | Mahendran | B01D 67/0011 210/490 |
| 2003/0106855 A1 * | 6/2003 | Kin | C02F 1/32 210/748.15 |
| 2005/0040117 A1 * | 2/2005 | Pfeiffer | B01D 36/04 210/778 |
| 2007/0272628 A1 | 11/2007 | Mickols et al. | |
| 2016/0354725 A1 * | 12/2016 | Kakigami | B01D 61/08 |

FOREIGN PATENT DOCUMENTS

| | | | |
|---|---|---|---|
| JP | H11-165170 A | | 6/1999 |
| JP | 2000-51663 A | | 2/2000 |
| JP | 2000-93751 A | | 4/2000 |
| JP | 2000-167358 A | | 6/2000 |
| JP | 2000-218135 A | | 8/2000 |
| JP | 2000-288356 A | | 10/2000 |
| JP | 2001-347142 A | | 12/2001 |
| JP | 2006-26484 A | | 2/2006 |
| JP | 2007-523744 A | | 8/2007 |
| JP | 2007-313445 A | | 12/2007 |
| JP | 2009-172531 A | | 8/2009 |
| JP | 2009-240917 A | | 10/2009 |
| JP | 2012-245439 A | | 12/2012 |
| JP | 2012245439 A | * | 12/2012 |
| JP | 2013-022544 A | | 2/2013 |
| JP | 2013-141643 A | | 7/2013 |

OTHER PUBLICATIONS

Japanese Office Action of JP Application No. 2014-074080 dated Jun. 18, 2015.
Japan Patent Office, "Opposition for Japanese Patent No. 5900527," Oct. 6, 2016.
Taniguchi, M. et al., "Boron reduction performance of reverse osmosis seawater desalination process," Journal of Membrane Science, 2001, p. 259-267, vol. 183, Elsevier Science B.V.
Nakao, S. et al., "Analysis of Solutes Rejection in Ultrafiltration," Journal of Chemical Engineering of Japan, 1981, p. 32-37, vol. 14, No. 1.
"Testing Methods for Solute Rejection and Water Flux of Reverse Osmosis Membrane Element and Module using Ageous Solution of Various Solutes," Japanese Industrial Standard (JIS), Jan. 1, 1990 Japanese Industrial Standards Committee, Japanese Standards Association, Tokyo, Japan.
"3.8 Membrane module shape and structure," Water purification membrane, Jun. 10, 2003 p. 74-79, The Association of Membrane Separation Technology of Japan, Japan.
Sawada, S., "Membrane filtration technology in the field help," 2006, p. 22-25, 106-110, Kogyo Chosakai, Japan.
"Spiral reverse osmosis element SWC4 MAX Instruction Manual," Membrane Division, Nitta Denko Corporation, Aug. 2015, p. 1-34.
Nakao, S. et al., "New Development of Water Treatment Technology Using Membrane," Sep. 30, 2004 p. 125-126, CMC Publishing Co., Ltd.
Ito, A., "Tokoton friendly Membrane Separation Book," B & T Books—To know things from now series, Jul. 20, 2010 Nikkan Kogyo Shimbun, Japan.
"SWC4 MAX Spec Sheet," Nitta Denko, HYDRANAUTICS A Nitta Denko Company, Hydranautics Corporate, USA.
Boda, R. et al., "Performance of high area spiral wound elements in waste water reuse RO system," Desalination and Water Treatment, 2009, p. 61-68, vol. 6, Desalination Publications.
Kurumatani, M. et al., "Process Development and Application of Membrane Technology," Process and Production Technology Center, Sumitomo Chemical Co., Ltd., 2007, p. 40-48.

* cited by examiner

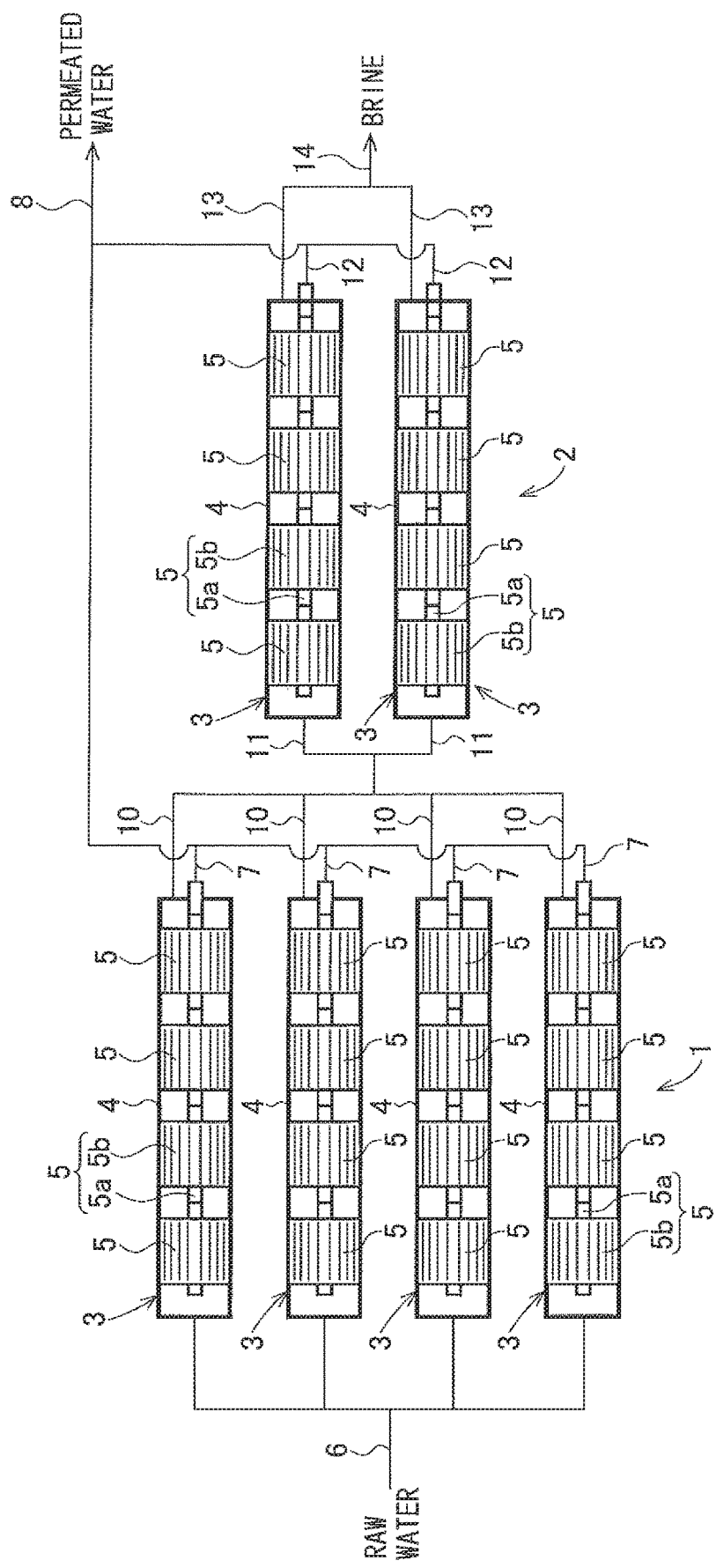

METHOD FOR TREATING WATER CONTAINING LOW-MOLECULAR-WEIGHT ORGANIC SUBSTANCE

CROSS-REFERENCE TO RELATED APPLICATIONS

The present application is National Phase Application of International Application No. PCT/JP2015/058740 filed on Mar. 23, 2015, and claims priority from Japanese Patent Application No. 2014-074080 filed on Mar. 31, 2014.

FIELD OF THE INVENTION

The present invention relates to a method for treating water containing a low-molecular-weight organic substance and particularly relates to a method for treating water containing a low-molecular-weight organic substance by using a high-pressure reverse-osmosis-membrane device which is suitable for a primary pure-water system and a recovery system included in an ultrapure-water production apparatus.

BACKGROUND OF THE INVENTION

Fields in which reverse osmosis membranes (RO), which enable efficient removal of impurities contained in water, such as desalination and removal of organic substances, are applied have been developing year by year. It is commonly known that reverse osmosis membranes enable removal of organic substances as a result of a molecular sieving effect and repulsion caused by a charge on the surface of the membrane (typically, charged negatively). Although a rejection rate of the organic substances rejected by the reverse osmosis membrane is high, that is, specifically, 99% or more, when the organic substances have a molecular weight of more than 200, the rejection rate significantly decreases when the molecular weight of the organic substances is 200 or less.

Accordingly, wastewater containing mainly low-molecular-weight alcohols (e.g., IPA), such as wastewater from semiconductor factories, has been commonly treated and recovered by being subjected to a biological treatment and subsequently to cell separation (pretreatment) and treated with RO. This RO membrane is an ultralow-pressure RO membrane or a low-pressure RO membrane that is normally operated at a pressure of 0.75 MPa or 1.47 MPa, respectively. The above biological treatment apparatus requires large installation space, and operation management of the biological treatment is complicated. There has also been proposed a multi-stage RO method in which water containing a low-molecular-weight organic substance is RO-treated with a plurality of RO devices arranged in series. However, since the rejection rate of low-molecular-weight organic substances rejected by a low-pressure or ultralow-pressure RO is low as described above, the TOC concentration in the permeated water may be increased and biofouling may occur at a position to which the permeated water is fed.

In a technique described in Patent Literature 1, a high-pressure RO device is disposed in a primary pure-water system capable of producing ultrapure water in order to remove organic substances.

High-pressure reverse-osmosis-membrane separation devices have been commonly used in seawater desalination plants and operated at a high pressure of about 5.52 MPa in order to achieve a reverse-osmosis-membrane treatment of seawater, which contains a high concentration of salt.

Since reverse osmosis membranes for seawater desalination typically include a skin layer that contributes to desalination and the removal of organic substances and has a closely packed molecular structure, the rejection rate of organic substances rejected by the reverse osmosis membrane is high. For desalinating seawater, it is necessary to set the operating pressure to 5.5 MPa or more in order to produce an adequate amount of permeated water because the salt concentration in the raw water is high and the osmotic pressure of the raw water is accordingly high. In contrast, the salt concentration in raw water fed to RO membranes commonly used in the field of electronic industry is low. Specifically, the concentration of TDS (total dissolved substance) in the raw water is 1500 mg/L or less. Since such raw water has a low osmotic pressure, it is possible to produce a sufficient amount of permeated water with an operating pressure of about 2 to 3 MPa. Furthermore, the quality of the permeated water is markedly increased compared with the cases where the reverse osmosis membranes (ultralow-pressure RO membranes and low-pressure RO membranes) are used as in the related art.

Patent Literature 1: Japanese Patent Publication 2012-245439A

SUMMARY OF THE INVENTION

An object of the present invention is to provide a method for RO-treating water containing a low-molecular-weight organic substance, that is, specifically, a method for treating water containing a low-molecular-weight organic substance which enables the low-molecular-weight organic substance to be removed with certainty at a sufficient level without subjecting the water to a biological treatment.

The present invention provides a method for treating water containing a low-molecular-weight organic substance, the method comprising passing raw water to a high-pressure reverse-osmosis-membrane separation device, the raw water containing a low-molecular-weight organic substance having a molecular weight of 200 or less at a concentration of 0.5 mgC/L or more, wherein an amount of brine discharged from a reverse-osmosis-membrane module disposed at an end of a final stage of the high-pressure reverse-osmosis-membrane separation device is 2.1 to 5 $m^3/(m^2 \cdot D)$.

In the present invention, the high-pressure reverse-osmosis-membrane separation device preferably has a pure-water flux of 0.6 to 1.3 $m^3/(m^2 \cdot D)$ at an effective pressure of 2.0 MPa. The water fed to the high-pressure reverse-osmosis-membrane separation device preferably has a TDS concentration of 1500 mg/L or less. The high-pressure reverse-osmosis-membrane separation device is operated preferably at a pressure of 1.5 to 3 MPa.

Advantageous Effects of the Invention

The inventor of the present invention conducted various studies and, as a result, found that, in a method in which water containing an organic substance is treated with a high-pressure RO device as in Patent Literature 1, the rejection rate of the low-molecular-weight organic substance decreases when the amount of brine discharged from the high-pressure RO device is small.

In the method for treating water containing a low-molecular-weight organic substance according to the present invention, the low-molecular-weight organic substance contained in the water is removed by using a high-pressure RO device.

In the present invention, the amount of brine discharged from an RO module disposed at an end of the final stage is set to 2.1 m³/(m²·D) or more. This enables not only organic substances having a molecular weight of more than 200 but also low-molecular-weight organic substances having a molecular weight of 200 or less to be removed at a sufficient level. Thus, according to the present invention, it is possible to remove a low-molecular-weight organic substance contained in water at a sufficient level without subjecting the water to a biological treatment. The reason for which increasing the amount of brine discharged from the RO module disposed at the end of the final stage to 2.1 m³/(m²·D) or more enables low-molecular-weight organic substances to be removed at a sufficient level is presumably because the polarization of the concentration of the organic substance which occurs on the primary-side (raw-water-side) surface of the reverse osmosis membrane is reduced.

BRIEF DESCRIPTION OF DRAWINGS

FIG. 1 is a flow diagram illustrating a method for treating water containing a low-molecular-weight organic substance according to an embodiment.

DESCRIPTION OF EMBODIMENTS

In the present invention, water containing a low-molecular-weight organic substance is treated by using a high-pressure reverse-osmosis-membrane device.

A high-pressure RO device is a reverse-osmosis-membrane separation device commonly used for desalinating seawater and includes a more closely packed skin layer deposited on the surface of the membrane than low-pressure and ultralow-pressure reverse osmosis membranes, which have been included in primary pure-water systems of ultrapure-water production apparatuses. Accordingly, high-pressure reverse osmosis membranes enable a higher rejection rate of organic substances than low-pressure or ultralow-pressure reverse osmosis membranes despite the amount of water capable of permeating through the membrane per unit operating pressure being low.

As described above, the amount of water capable of permeating through the membrane included in a high-pressure RO membrane device per unit operating pressure is low. In the present invention, it is suitable to use a high-pressure RO membrane device having an effective pressure of 2.0 MPa, a pure-water permeation flux of 0.6 to 1.3 m³/m²/day at 25° C., and a NaCl rejection rate of 99.5% or more. The term "effective pressure" refers to an effective pressure applied to the membrane, which is the average operating pressure minus the sum of the difference in osmotic pressure and the secondary-side pressure. The term "NaCl rejection rate" refers to a rejection rate measured using an aqueous NaCl solution containing 32000 mg/L of NaCl at 25° C. at an effective pressure of 2.7 MPa. The term "average operating pressure" refers to the average of the pressure (operating pressure) of water fed to the membrane on the primary side and the pressure (pressure at outlet of concentrated water) of the concentrated water and is expressed using the following expression.

Average Operating Pressure=(Operating Pressure+ Concentrated Water Outlet Pressure)/2

The high-pressure reverse osmosis membrane includes a more closely packed skin layer disposed on the surface of the membrane than low-pressure and ultralow-pressure reverse osmosis membranes, which have been included in primary pure-water systems of ultrapure-water production apparatuses. Accordingly, the high-pressure reverse osmosis membrane achieves a markedly higher rejection rate of organic substances than a low-pressure or ultralow-pressure reverse osmosis membrane despite the amount of water capable of permeating through the membrane per unit operating pressure being low. In the case where feedwater containing salts at a TDS (total dissolved substance) concentration of 1500 mg/L or less is treated with a reverse osmosis membrane, an osmotic pressure of about 1.0 MPa is applied to the reverse osmosis membrane at maximum under operating conditions in which a water recovery rate is set to 90%. Thus, in the case where a high-pressure reverse-osmosis-membrane separation device is used for treating feedwater having a TDS concentration of 1500 mg/L or less, it is possible to produce water at an operating pressure of preferably 1.5 to 3 MPa and particularly preferably about 2 to 3 MPa in an amount substantially equal to the amount of water produced with a low-pressure or ultralow-pressure reverse osmosis membrane. As a result, by using a single-stage RO membrane treatment, it becomes possible to produce treated water having a quality comparable to those of water treated by two-stage RO membrane treatments used in the related art in an amount substantially equal to those of water treated by the two-stage RO membrane treatments. This allows the numbers of membranes, vessels, and pipes to be reduced and reduces the cost and installation space.

The high-pressure reverse-osmosis-membrane separation device preferably has a pure-water flux of 0.6 to 1.3 m³/(m²·D) at an effective pressure of 2.0 MPa.

The shape of the reverse osmosis membrane is not limited. The RO membrane may be, for example, a spiral membrane, a hollow-fiber membrane, a 4-inch RO membrane, an 8-inch RO membrane, or a 16-inch RO membrane.

The present invention is described below in detail with reference to FIG. 1.

FIG. 1 is a flow diagram illustrating an example of a method for treating water containing a low-molecular-weight organic substance according to the present invention. The high-pressure RO device includes a primary bank 1 and a secondary bank 2. The banks 1 and 2 each include a plurality of high-pressure RO units 3 arranged in parallel to one another. The high-pressure RO units 3 each include a pressure-resistant vessel 4 and high-pressure RO modules 5 arranged in the vessel 4. The high-pressure RO modules 5 are arranged in series in each vessel 4.

In this embodiment, the high-pressure RO modules 5 are spiral modules each including a water-collection pipe 5a and a high-pressure RO membrane 5b wound around the outer periphery of the water-collection pipe 5a. The water-collection pipes 5a included in the respective modules 5 are connected to one another in series. Water-to-be-treated flows from an end surface of the wound body including the high-pressure RO membrane 5b into a raw-water channel formed between the membranes and discharges from the other end surface of the wound body.

Raw water (water containing a low-molecular-weight organic substance) is fed through a raw-water pipe 6 and distributed to the high-pressure RO units 3 of the primary bank 1. In each high-pressure RO unit 3, while the water-to-be-treated flows from an end surface (left-side surface in the drawing) of each high-pressure RO module 5 toward the other end surface (right-side surface in the drawing), the water-to-be-treated passes through the raw-water channel, permeates through the membrane, and flows into a permeated-water channel formed between the membranes. The permeated water passes through the permeated-water channel of each high-pressure RO module 5 in a spiral direction, flows into the water-collection pipe 5a, and is ejected from the corresponding one of permeated-water pipes 7 through a permeated-water confluence ejection pipe 8.

The brine (concentrated water), which has passed through one of the high-pressure RO modules 5 which is disposed at the most downstream position of each of the RO units 3 of the primary bank 1, is extracted from the corresponding one of primary brine pipes 10, temporarily merges with brine extracted from the other RO units 3, and is distributed to the high-pressure RO units 3 of the secondary bank 2 through distribution pipes 11. In the high-pressure RO units 3 of the secondary bank 2, a RO-membrane treatment is performed as in the primary bank 1. The resulting permeated water is extracted from the permeated water pipes 12 via the permeated-water confluence ejection pipe 8.

The brine (final brine) that has passed through one of the high-pressure RO modules 5 which is disposed at the most downstream position, that is, the final stage, of each of the RO units 3 of the secondary bank 2, is extracted from a final brine pipe 13, of each RO unit 3 via a brine confluence ejection pipe 14. The amount of brine discharged from each of the RO modules 5 disposed at the end of the final stage can be determined by dividing the flow rate (m³/Day) of the brine discharged through the corresponding one of the final brine pipes 13 by the area (m²) of the membrane included in the RO module 5.

In the present invention, the quality of raw water is preferably such that the concentration of a low-molecular-weight organic substance having a molecular weight of 200 or less in the raw water is 0.5 mgC/L or more, more preferably 10 to 200 mgC/L, and particularly preferably 100 to 200 mgC/L. Examples of the low-molecular-weight organic substance include isopropyl alcohol (IPA), ethanol, methanol, acetic acid, an acetate, acetone, TMAH (trimethylammonium hydroxide), MEA (monoethanolamine), and DMSO (dimethyl sulfoxide). The raw water preferably has a TDS concentration of 1500 mg/L or less.

An example of such water containing a low-molecular-weight organic substance is water recovered from a process of manufacturing electronic components such as semiconductors. In the present invention, this recovered water can be directly introduced into a high-pressure RO membrane device without being pre-treated.

In the present invention, the amount of brine discharged from each of the high-pressure RO modules disposed at the final stage (in FIG. 1, the high-pressure RO modules 5 that are disposed at the most downstream position of the respective high-pressure RO units 3 of the secondary bank 2) is set to 2.1 m³/(m²·D) or more, is preferably set to 2.1 to 5 m³/(m²·D), and is particularly preferably set to 2.1 to 4 m³/(m²·D). In the case where the amount of brine discharged from each of the high-pressure RO modules 5 disposed at the final stage is set to 2.1 m³/(m²·D) or more, the amount of brine discharged from each of the high-pressure RO modules disposed upstream of the final high-pressure RO modules 5 is also set to 2.1 m³/(m²·D) or more. Increasing the amount of brine discharged from each of the high-pressure RO modules to 2.1 m³/(m²·D) or more reduces the degree of concentration polarization (concentration) of the low-molecular-weight organic substance that occurs on a surface of the membrane which is located on the primary side (water-to-be-treated side) of each high-pressure RO module and increases the rejection rate of the low-molecular-weight organic substance.

Although the high-pressure RO device according to the above-described embodiment includes the two banks arranged in series, that is, the primary bank 1 and the secondary bank 2, the high-pressure RO device may include only the primary bank or may alternatively further include a higher-order bank, that is, a tertiary or higher bank, arranged in series. The number of the RO units 3 included in each bank may be one. Each vessel does not necessarily include a plurality of modules and may include only one module.

EXAMPLE

Example 1

Samples of simulated wastewater from semiconductor factories (aqueous IPA solutions) that contained IPA at TOC concentrations of 300, 500, 1000, and 5000 µgC/L were passed through a high-pressure reverse osmosis membrane for seawater desalination "SWC4-Max" produced by Nitto Denko Corporation under the following conditions:
 amount of brine: 2.1 m³/(m²·D);
 water recovery rate: 75%;
 effective pressure on surface of membrane: 1.5 MPa.

Table 1 summarizes the results of measurement of TOC concentrations in the permeated water samples.

Comparative Example 1

The samples of simulated wastewater from semiconductor factories used in Example 1 were treated using a carrier-packed biological treatment apparatus (BM-SK: produced by Kurita Water Industries Ltd.), subsequently subjected to cell separation by using a membrane pretreatment (SFL: produced by Kuraray Co., Ltd.), and passed through an ultralow-pressure RO membrane ("ES-20" produced by Nitto Denko Corporation) such that the amount of brine was 2.1 m³/(m²·D) and the water recovery rate was 75%. Table 1 summarizes the results of measurement of TOC concentrations in the permeated water samples.

TABLE 1

| Feedwater TOC (µgC/L) | Example 1 permeated water TOC (µgC/L) | Comparative Example 1 permeated water TOC (µgC/L) |
| --- | --- | --- |
| 300 | 20 | 17 |
| 500 | 18 | 23 |
| 1000 | 28 | 39 |
| 5000 | 45 | 50 |

Example 2

In Example 2, a high-pressure RO device having the following structure was used.
 Number of banks: 2
 Number of high-pressure RO units of the primary bank: 8
 Number of high-pressure RO units of the secondary bank: 4
 Number of modules included in each high-pressure RO unit: 4 (the modules were connected to one another in series)
 High-pressure RO membrane: high-pressure reverse osmosis membrane for seawater desalination "SWC4-MAX" produced by Nitto Denko Corporation Samples of simulated wastewater from semiconductor factories (aqueous IPA solutions) that contained IPA at a TOC concentration of 500 µg/L were passed through the above high-pressure RO device such that the water recovery rate was 75%, the effective pressure applied to the surface of the membrane was 1.5 MPa, and the amount of brine discharged from each of the modules disposed at the final stage was 2.1 m$^3$/(m$^2$·D), 2.9 m$^3$/(m$^2$·D), and 4.1 m$^3$/(m$^2$·D). Table 2 summarizes the results of measurement of TOC concentrations in the permeated water samples.

Comparative Example 2

A treatment was performed under the same conditions as in Example 2, except that the amount of brine discharged from each of the modules disposed at the final stage was changed to 1.7 m$^3$/(m$^2$·D) and 1.2 m$^3$/(m$^2$·D). Table 2 summarizes the results of measurement of TOC concentrations in the permeated water samples.

TABLE 2

|  | Amount of brine at final stage (m$^3$/(m$^2$ · D)) | TOC (μgC/L) |
| --- | --- | --- |
| Comparative Example 2 | 1.2 | 32 |
| | 1.7 | 25 |
| Example 2 | 2.1 | 18 |
| | 2.9 | 17 |
| | 4.1 | 16.8 |

As is clear from Examples and Comparative Examples above, according to the present invention, water containing a low-molecular-weight organic substance can be treated by using an RO device at a sufficient level without being subjected to a biological treatment. Since a biological treatment is not performed, the need for cell separation can be eliminated, which enables the conditions for pretreatment operation to be eased.

Although the present invention has been described in detail with reference to a particular embodiment, it is apparent to a person skilled in the art that various modifications can be made therein without departing from the spirit and scope of the present invention.

The present application is based on Japanese Patent Application No. 2014-074080 filed on Mar. 31, 2014, which is incorporated herein by reference in its entirety.

The invention claimed is:

1. A method for treating water containing an organic substance, the method comprising:
    passing raw water to a high-pressure reverse-osmosis-membrane separation device, the raw water containing an organic substance having a molecular weight of 200 or less at a concentration of 10 to 200 mgC/L, thereby producing the treated water,
    wherein the high-pressure reverse-osmosis-membrane separation device has a plurality of reverse-osmosis-membrane modules arranged in series so that brine from one of the plurality of reverse-osmosis-membrane modules flows into a succeeding one of the plurality of reverse osmosis-membrane modules as water-to-be-treated,
    wherein the high-pressure reverse-osmosis-membrane separation device comprises a plurality of banks, each of the plurality of banks comprises a plurality of high-pressure reverse osmosis membrane units arranged in parallel to each other, and
    each of the plurality of high-pressure reverse osmosis membrane units includes a pressure-resistant vessel and the plurality of reverse-osmosis-membrane modules arranged in series in the pressure-resistant vessel;
    an amount of the brine discharged from one of the plurality of reverse-osmosis membrane modules disposed at an end of a final stage of the high-pressure reverse-osmosis membrane separation device is 2.1 to 5 m$^3$/(m$^2$·D), and
    the high-pressure reverse-osmosis-membrane separation device has a pure-water flux of 0.6 to 1.3 m$^3$/(m$^2$·D) at an effective pressure of 2.0 MPa;
    wherein the plurality of reverse-osmosis-membrane modules are spiral modules including a water-collection pipe and a high-pressure reverse osmosis membrane wound around an outer periphery of the water-collection pipe.

2. The method for treating water containing an organic substance according to claim 1, wherein the water fed to the high-pressure reverse-osmosis-membrane separation device has a TDS concentration of 1500 mg/L or less.

3. The method for treating water containing an organic substance according to claim 1, wherein the high-pressure reverse-osmosis-membrane separation device is operated at a pressure of 1.5 to 3 MPa.

4. The method for treating water containing an organic substance according to claim 1, wherein the organic substance is at least one selected from isopropyl alcohol, ethanol, methanol, acetic acid, an acetate, acetone, trimethylammonium hydroxide, monoethanolamine, and dimethyl sulfoxide.

5. The method for treating water containing an organic substance according to claim 1, wherein the raw water is water recovered from a process of manufacturing electronic components.

6. The method for treating water containing an organic substance according to claim 5, wherein the recovered water is directly passed through the high-pressure reverse-osmosis-membrane separation device without being pre-treated.

7. The method for treating water containing an organic substance according to claim 1, wherein the high-pressure reverse-osmosis-membrane separation device comprises a first bank and a second bank arranged in series, and the amount of brine discharged from the second bank of the high-pressure reverse-osmosis-membrane separation devices is 2.1 to 5 m$^3$/(m$^2$·D).

8. The method for treating water containing an organic substance according to claim 1, wherein a number of the high-pressure reverse-osmosis-membrane separation devices is one.

9. The method for treating water containing an organic substance according to claim 1, wherein in the plurality of reverse-osmosis-membrane modules in the pressure-resistant vessel, the water-collection pipes of the spiral modules are connected in series.

10. The method for treating water containing an organic substance according to claim 7, wherein a number of the plurality of high-pressure reverse osmosis membrane units in the first bank is greater than a number of the plurality of high-pressure reverse osmosis membrane units in the second bank.

* * * * *